May 12, 1959

A. IVANOFF 2,885,963

STRUCTURES COMPRISING A MOTOR AND A PUMP DRIVEN THEREBY

Filed Dec. 10, 1954

INVENTOR
ALEXANDER IVANOFF
By
ATTORNEY

May 12, 1959 A. IVANOFF 2,885,963
STRUCTURES COMPRISING A MOTOR AND A PUMP DRIVEN THEREBY
Filed Dec. 10, 1954 2 Sheets-Sheet 2

INVENTOR
ALEXANDER IVANOFF
BY
ATTORNEY

United States Patent Office 2,885,963
Patented May 12, 1959

2,885,963
STRUCTURES COMPRISING A MOTOR AND A PUMP DRIVEN THEREBY

Alexander Ivanoff, Greenwich, Conn., assignor to Hayward-Tyler and Company Limited, Luton, England, a British company Application December 10, 1954, Serial No. 474,513

Claims priority, application Great Britain December 11, 1953

10 Claims. (Cl. 103—87)

This invention relates to structures comprising a motor and a pump driven thereby. The object of the invention is the provision of an improved pump and motor structure of this character. The invention consists broadly of a pump and motor combination, in which the impeller of the pump and the rotor of the motor are mounted on a common shaft and the pump and motor are enclosed in a common casing to which the liquid being pumped has access and which also encloses said shaft and the bearings therefor, so that said bearings do not have to withstand any substantial pressure differential when the fluid being pumped is at high pressure, wherein said common casing comprises two parts, hereinafter called the motor casing part and the pump casing part, joined together in a plane of junction displaced from the pump in the direction towards the motor, the arrangement being such that the stator of the motor and the shaft bearings, and therefore the shaft and the rotor of the motor and the pump impeller, are all incorporated in one unit with the motor casing part, in such a way that, upon separating said casing parts, said stator, bearings, shaft, rotor and impeller come away with said motor casing part.

In order that the invention may be the more clearly understood a pump and motor combination in accordance therewith will now be described, reference being made to the accompanying drawings wherein.

Figure 1:
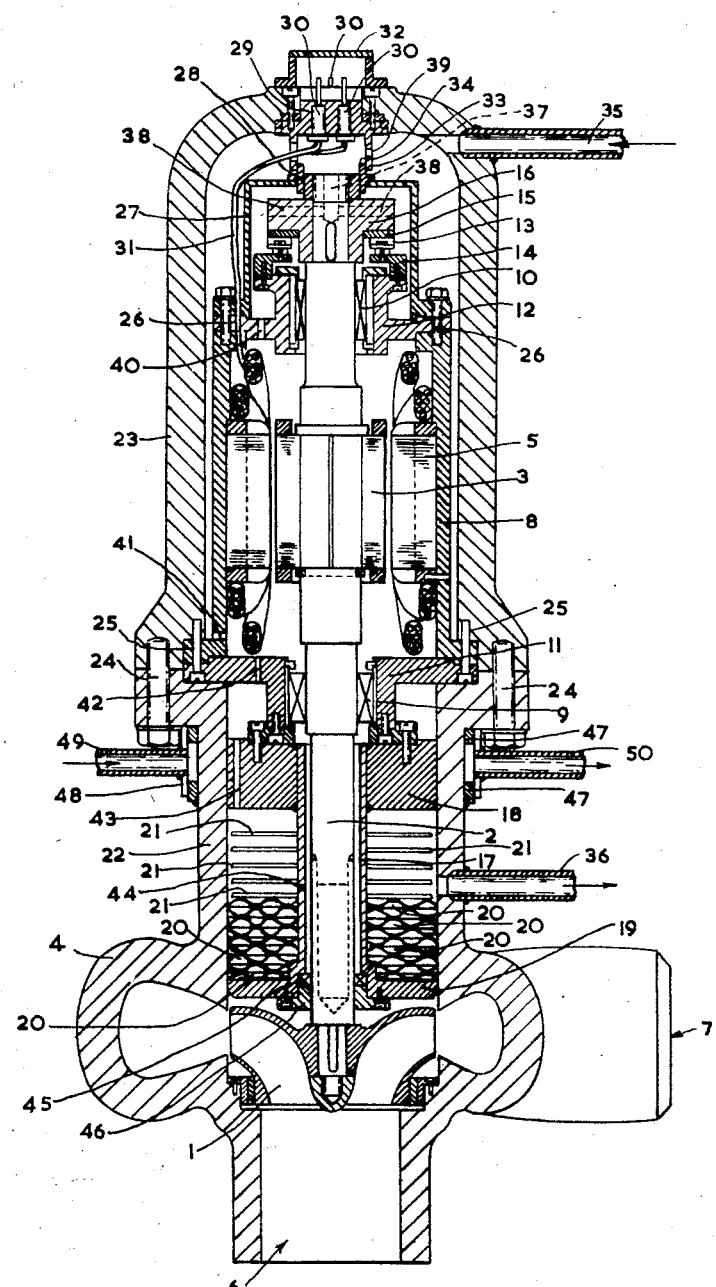
Figure 1 is a sectional elevation of said pump and motor combination.

Referring to the drawings a centrifugal pump has its impeller 1 mounted on one end of a common shaft 2, which has mounted on it near its other end the rotor 3 of an electric motor of the squirrel cage type, and the pump casing 4 is extended at 22 and 23 to form also an enclosure for both said rotor 3 and the stator 5 of said electric motor, as well as, of course, for the whole of the shaft 2.

The liquid being pumped enters axially through an opening 6 at the pump end of the casing and leaves through an opening 7 at the side of the casing level with the impeller 1 in the usual way, the portion of the casing immediately around said impeller being of considerably greater diameter than said impeller. The extended portion 22, 23 of the pump casing 4 is of considerably less diameter than said portion immediately around said impeller, but is of slightly greater diameter than the impeller itself. This extended portion is approximately cylindrical and is of course coaxial with the common shaft 2.

The rotor 3 of the electric motor is mounted on said common shaft 2 near the end remote from the pump impeller 1, a very considerable space being left between said rotor and the pump impeller. The stator 5 surrounds the rotor 3 in the usual way, and is carried within a relatively thin stator shell 8 which in turn is secured to the casing.

The common shaft 2 runs in two journal bearings 9 and 10. The bearing 9 is near the end of the motor towards the pump, and is carried by a housing 11 secured to the stator shell 8 at that end. The bearing 10 is near the other end of the motor and is carried by another housing 12 secured to the stator shell 8 at the other end.

The apparatus is intended to be used as shown in Figure 1, with the shaft 2 vertical and the pump at the lower end, and the downward thrust of the shaft is supported by an end thrust bearing 13. Both of the journal bearings 9 and 10 and also the end thrust bearing 13 are of the tilting pad type. In the case of the end thrust bearing 13 the tilting pads are carried by a ring 14 which in turn is carried by the bearing housing 12. The tilting pads support a bearing surface 15 on the underside of a disc 16 mounted on the shaft 2.

Surrounding the portion of the shaft 2 between the pump impeller 1 and the lower journal bearing 9 is a stationary sleeve 17. The inner periphery of said sleeve 17 is very close to the outer periphery of said shaft 2. At its upper end said sleeve is secured by welding to a surrounding thick conduction disc 18 of metal whose outer periphery fits closely within the extension portion 22 of the pump casing. This conduction disc 18 is in turn secured to the underside of the bearing housing 11.

At its lower end said sleeve 17 is formed with an outwardly extending flange 19 whose outer periphery engages the inner periphery of the casing just above the large diameter part which surrounds the pump impeller 1.

Around said stationary sleeve 17 is a stack of disc shaped elements 20, formed with circular coaxial corrugations, which fit fairly closely between the outer periphery of said sleeve and the inner periphery of the casing. These elements 20 are supported upon the flange 19 at the lower end of said sleeve, and the uppermost one is about half way between said flange 19 and the conduction disc 18. The elements 20 are arranged so that upward and downward corrugations of adjacent elements engage and a number of annular spaces are formed between the elements.

Between the stack of elements 20 and the conduction disc 18, a number of flat, horizontal, disc-shaped thermal baffles 21 are provided these being permanently secured around said sleeve 17 in spaced relation and having their circumferential edges close to the inner surface of the casing.

It will be seen that the extension 22, 23 of the pump casing consists of one part 22 which is integral with the pump casing and a second part 23 which is secured to said part 22 by means of bolts 24 and whose upper end is closed. The shell 8 of the motor stator and also the housing 11 of the motor 9 are both secured to the part 23, said shell and housing both having outwardly extending flanges which are bolted to the under end of said part 23 by means of bolts 25. It will thus be seen that, by unbolting the bolts 24 the upper part 23 of the casing can be lifted from the part 22 and will take with it the whole of the inner mechanism including the pump impeller 1 and everything above it, leaving the pump casing which may be permanently welded into the pipe work.

As clearly shown, the mounting of the bearing housing 12 on the top end of the shell 8 is effected by providing said housing with an outwardly extending flange and bolting said flange on the top of said shell by means of bolts 26. The same bolts 26 also secure a circulation cylinder 27 down on the flange of the housing 12. This circulation cylinder 27 forms a hood enclosing the bearings 10 and 13 and their housings and also the disc 16. The upper end of said circulation cylinder 27 has an opening in it which mates with an annular part 28 mounted on the extremity of the shaft 2 beyond the disc 16, so that a running seal is formed between said part and said opening.

The top of the casing part 23 has an opening in it which is closed and sealed by means of an insulating plug 29 through which terminal elements 30 pass, which are connected by way of conductors 31 to the windings of the stator 5. This plug 29 and its terminal element can be assembled in the factory. A terminal box 32 covers the outer ends of these terminal elements 30. An annular skirt 33 extends integrally down from the plug 29 and makes a running seal with an annular ridge 34 on the top of the part 28.

Cooling liquid is circulated through the casing and to this end an external cooler (not shown) is provided, from the outlet of which a pipe 35 extends which communicates with the top end of the casing. Another pipe 36 extends from the inlet of said external cooler and communicates with the casing at a level about mid way between the pump impeller 1 and the conduction disc 18. The circulation of this cooling liquid is effected by means of an auxiliary impeller formed by boring a hole 37 axially in the upper end of the shaft 2 and other holes 38 radially into the disc 16 said holes 38 continuing into the shaft 2 and breaking into the hole 37. Thus a centrifugal impeller is constituted whose inlet is a tthe upper end of the hole 37 and whose outlet is from the outer ends of the holes 38. To make the circulation of the cooling liquid possible, the following ports are provided: ports 39 in the skirt 33, ports 40 in the flange of the bearing housing 12, ports 41 in the shell 8 near the bottom end thereof, ports 42 in the flange of the bearing housing 11, ports 43 through the conduction disc 18 and ports 44 in the sleeve 17 at about the level of the pipe 36.

To prevent sediment from the main pumped liquid from reaching the bearings, a sediment baffle 45 is provided between the sleeve 17 and the shaft 2 in a countersinking at the lower end of said sleeve, said baffle being held in place at the appropriate pressure by means of a fixing ring 46. This baffle may consist of asbestos base packing.

A cooling water jacket surrounds the casing immediately around the conduction disc 18. This is constituted by two rings 47 welded around the casing one above the other and a cover ring 48 covering said rings. An inlet pipe 49 from a source of cold water passes through said cover plate to the space between the rings 47, and an outlet pipe 50 passes from said space through said cover plate to waste.

The pump is intended for pumping hot liquid which is at high pressure, such as the water of a La Monte boiler. It will be seen that there is communication between this pumped liquid and the portion of the casing which houses the motor, said communication being partly by way of the small annular clearance between the shaft 2 and the surrounding stationary sleeve 17 and then through the lower journal bearing 9, and partly through the small radial ports 44 in said sleeve, round the baffles 21 and through the ports 43 and 42. It will be appreciated that not much heat will be conveyed by way of either of these paths of liquid communication, owning to the films of liquid which constitute said paths being so thin. It will be appreciated that the bodies of liquid between the elements 20 and between the baffles 21 are substantially stagnant, and that the thin film of liquid between the shaft 2 and the sleeve 21 will not be subject to much agitation. In each case little heat will be conveyed.

A certain amount of heat is conveyed upwards from the pump through the shaft 2, and a certain amount is also conveyed upwards through the wall of the extension 22 of the casing. The latter heat will be conveyed away by the water jacket when it reaches the same, and the heat through the shaft 2 will also be conveyed away by the water jacket, passing first radially outwards through the conduction disc 18.

The liquid which is continuously circulated through the external cooler flows from the outlet of said cooler through the pipe 35 into the top of the casing and thence through the ports 39, into the inlet 37 and out of the outlets 38 of the auxiliary impeller. Here the stream divides, one portion flowing through the ports 40 to the space above the motor and the other flowing through the bearings 13 and 10 to said space above the motor. From there the stream flows around the stator windings and through the clearance between the stator and the rotor to the underside of the motor. Thereafter the stream again divides, one portion flowing down through the ports 42 and 43 and back to the inlet of the cooler through the pipe 36, and the other portion flowing through the bearing 9, down through the clearance between the shaft 2 and the sleeve 17 and out through the port 44 and through said pipe 36 to the inlet of the cooler. It will be seen that, in addition to the various means for impeding the heat flow from the pump to the motor, this circulation through the outside cooler and the major portion of the casing further ensures that the motor and bearings shall remain cool.

It will be seen that the circulation cylinder 27 ensures that all the liquid flowing from the auxiliary impeller shall flow down both through and around the bearings 13 and 10 and then through the motor. The ports 41, however, permit some of the liquid, after having passed down through the motor to flow to the outside of the shell 8.

It will thus be seen that little of the heat in the pumped liquid will reach the motor, although there is free communication between the liquid being pumped and the motor which keeps the pressure of the liquid around the motor substantially the same as that of the liquid being pumped, and although the motor is contained in a common casing with the pump.

The portion of the shaft 2 between the impeller and say the mid level of the baffles 21 is made hollow, in order to reduce the heat transmitted by said shaft. This is in accordance with prior Patent No. 2,601,146.

It will be appreciated that the joint between the lower and upper parts 22 and 23 of the casing is above the water jacket and is therefore cool. This is an exceedingly important advantage because, as is well known, large high temperature, high pressure bolted joints are difficult to make owing to thermal distortion of the components, differential expansion of the bolts and flanges and the necessity of using materials suitable for high temperature service.

Figure 2:
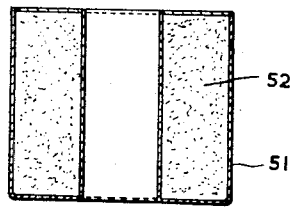
Figure 2 is a sectional elevation of a part which may be employed as an alternative to certain of the parts illustrated in Figure 1.
Figure 3:
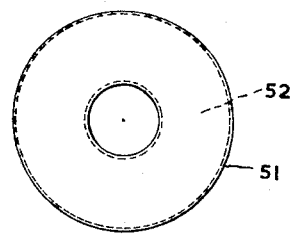
Figure 3 is a plan of said part.
Figure 4:
Figure 4 is a sectional elevation of one of a plurality of baffles illustrated in Figure 1.
Figure 5:
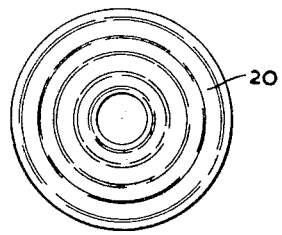
Figure 5 is a plan of the same.

Referring to Figures 2 and 3, these figures illustrate an alternative device to the elements 20 and baffles 21, for reducing heat transfer from the impeller 1 to the conduction disc 18. This device consists of an annular block adapted to fit round the sleeve 17 with its inner periphery close to said sleeve and the outer periphery close to the casing. The block consists of a thin leak-height welded metal case 51 filled with heat resisting cement or ceramic material 52. Said block rests on the flange 19 at the bottom of the sleeve with its upper surface fairly close to the under surface of the conduction disc 18. It fits closely round the sleeve 17 but has sufficient clearance from the wall of the casing to enable the liquid to flow out through the pipe 36 to the external cooler.

What is claimed is:

1. A liquid pumping system comprising, in combination, a rotary pump impeller, a motor having a stator and a rotor, a common shaft mounting said impeller and said rotor, a common casing housing said impeller and motor, bearings for said shaft also disposed in said casing, said casing having an inlet and an outlet for liquid to be pumped and passages for leading the liquid through the casing, whereby said bearings operate in a substantially equalized pressure, and being composed of two parts, one part constituting a motor casing part and the other a pump casing part, adjoining means adjoining said parts in a plane intermediate the impeller and the motor, and means resisting the flow of heat disposed within the casing between the impeller and said plane of junction for impeding the flow of heat from the impeller to the motor and the plane of junction, said means resisting heat flow including a thick annular metal conductor disc surrounding said shaft for conducting heat outwardly from said shaft to the wall of said common casing and a cooling jacket surrounding said wall at the region of said conductor disc, the motor, the shaft, the bearings therefor, and the impeller being all mounted on and supported by said motor casing part whereby upon separation of the casing parts the motor, the shaft, the bearings, and the impeller are detachable as a unit from said pump casing part.

2. A pumping system according to claim 1, wherein said cooling jacket is a water jacket.

3. A pumping system according to claim 1, wherein said means resisting heat flow further comprises heat baffle means located between said impeller and said conductor disc.

4. A liquid pumping system comprising, in combination, a rotary pump impeller, a motor having a stator and a rotor, a common shaft mounting said impeller and said rotor, a common casing housing said impeller and motor, bearings for said shaft also disposed in said casing, said casing having an inlet and an outlet for liquid to be pumped and passages for leading the liquid through the casing, whereby said bearings operate in a substantially equalized pressure, and means resisting the flow of heat disposed within the casing for impeding the flow of heat from the impeller to the motor, said means resisting heat flow including a thick annular metal conductor disc surrounding said shaft for conducting heat outwardly from said shaft to the wall of said common casing and a cooling jacket surrounding said wall at the region of said conductor disc.

5. A liquid pumping system comprising, in combination, a rotary pump impeller, a motor having a stator and a rotor, a common vertically disposed shaft mounting said impeller and said rotor, the motor being disposed above the impeller, a common casing housing said impeller and said motor, bearings for said shaft also disposed in said casing, said casing having an inlet and an outlet for the liquid to be pumped and passages for leading the liquid through the casing, whereby said bearings operate in a substantially equalized pressure, and being composed of two parts, one part constituting a motor casing part and the other a pump casing part, a disc mounted on said shaft near its upper end, an end thrust bearing supported by said motor casing part, said disc bearing down on said end thrust bearing to support the downward thrust of the shaft, adjoining means adjoining said parts in a plane intermediate the motor and the impeller, and means resisting the flow of heat disposed within the casing between the impeller and said plane of junction for impeding the flow of heat from the impeller to the motor and the plane of junction, the motor, the shaft, the bearings therefore and the impeller being all mounted on and supported by said motor casing part whereby upon separation of the casing parts the motor, the shaft, the bearings and the impeller are detachable as a unit from said pump casing part.

6. A pumping system according to claim 5 wherein the motor stator is mounted in a separate shell secured within the motor casing part, said shell mounting said end thrust bearing.

7. A pumping system according to claim 6 wherein said bearings are two journal bearings, on each end of the motor, said bearings being mounted on said shell.

8. A pumping system according to claim 7 wherein the upper journal bearing is disposed in a housing and said end thrust bearing is mounted on the housing, said housing being supported by said shell.

9. A pumping system according to claim 7 wherein common bolts secure the journal bearing next the impeller to said shell and also secure said shell to said motor casing part.

10. A liquid pumping system comprising, in combination, a rotary pump impeller, a motor having a stator and a rotor, a common vertically disposed shaft mounting said impeller and said rotor, the motor being disposed above the impeller, a common casing housing said impeller and said motor, bearings for said shaft also disposed in said casing, said casing having an inlet and an outlet for the liquid to be pumped and passages for leading the liquid through the casing, whereby said bearings operate in a substantially equalized pressure, and being composed of two parts, one part constituting a motor casing part and the other a pump casing part, a disc mounted on said shaft near its upper end, an end thrust bearing supported by said motor casing part, said disc bearing down on said end thrust bearing to support the downward thrust of the shaft, adjoining means adjoining said parts in a plane intermediate the motor and the impeller, the motor, the shaft, the bearings therefor and the impeller being all mounted on and supported by said motor casing part whereby upon separation of the casing parts the motor, the shaft, the bearings and the impeller are detachable as a unit from said pump casing part.

References Cited in the file of this patent

UNITED STATES PATENTS

| 2,120,914 | Vogel | June 14, 1938 |
| 2,598,547 | Ivanoff | May 27, 1952 |

FOREIGN PATENTS

| 701,511 | Great Britain | Dec. 30, 1953 |